(12) United States Patent
Haruki

(10) Patent No.: US 6,876,433 B1
(45) Date of Patent: Apr. 5, 2005

(54) IMAGE RECORDING APPARATUS

(75) Inventor: Toshinobu Haruki, Kyotanabe (JP)

(73) Assignee: Sanyo Electric Co., Ltd., Osaka (JP)

( * ) Notice: Subject to any disclaimer, the term of this patent is extended or adjusted under 35 U.S.C. 154(b) by 831 days.

(21) Appl. No.: 09/721,628

(22) Filed: Nov. 27, 2000

(30) Foreign Application Priority Data

Nov. 26, 1999 (JP) .............................................. 11-336252
Mar. 23, 2000 (JP) ....................................... 2000-082328

(51) Int. Cl.$^7$ ................................................ H04N 5/76
(52) U.S. Cl. .................. 352/244; 348/220.1; 348/231.2
(58) Field of Search ........................... 348/220.1, 231.1, 348/231.2, 231.3, 231.99; 352/244; 711/158

(56) References Cited

U.S. PATENT DOCUMENTS 5,585,845 A * 12/1996 Kawamura et al. ...... 348/231.2

FOREIGN PATENT DOCUMENTS

| EP | 0 448 378 | 9/1991 |
|----|-----------|--------|
| EP | 0 709 843 | 5/1996 |
| EP | 0 823 816 | 2/1998 |
| EP | 0 860 829 | 8/1998 |
| JP | 2000-339854 | 12/2000 |
| WO | WO 99/14755 | 3/1999 |

OTHER PUBLICATIONS

Office Action dated Nov. 12, 2002 with Translation.

* cited by examiner

Primary Examiner—Rodney Fuller
Assistant Examiner—Arthur A Smith
(74) Attorney, Agent, or Firm—Westerman, Hattori, Daniels & Adrian, LLP

(57) ABSTRACT

An image recording apparatus includes a record-mode selector switch. When a motion-image record mode is selected by the record-mode selector switch and the shutter button is pressed, camera signals of a plurality of screens are outputted from an image sensor. A signal processing circuit performs signal processing on camera signals of the plurality of screens to produce a compressed YUV signal. The produced compressed YUV signal is supplied via buffer memory to a disk control circuit. The disk control circuit drives an optical pickup and magnetic head and records the compressed YUV signal to a magneto-optical disk in the order of from a maximum vacant area.

13 Claims, 11 Drawing Sheets

|   | HEAD ADDRESS | VACANT SIZE (Kbyte) |
|---|---|---|
| ① | 3 | 320 |
| ② | 48 | 5030 |
| ③ | 71 | 2450 |
| ④ | 96 | 2680 |
| ⑤ | 132 | 7020 |
| ⑥ | 155 | 3410 |
| ⑦ | 174 | 1200 |
|   |   |   |
|   |   |   |

IMAGE RECORDING APPARATUS

BACKGROUND OF THE INVENTION

1. Field of the Invention

This invention relates to image recording apparatuses and, more particularly, to an image recording apparatus which is applicable, for example, to digital cameras wherein still-image and motion-image signals are recorded to a recording medium through a movable recording member, such as an optical pickup or magnetic head.

2. Description of the Prior Art

There is a well-known MS-DdS-formatted FAT (File Allocation Table) scheme as a method of recording data onto a recording medium. In the FAT scheme, record signals are processed on a cluster-by-cluster basis. Consequently, even where vacant areas are finely, sporadically distributed due to the repetition of recording and erasure, it is possible to record signals without problems as long as the total vacant area exceeds the signal size.

In the conventional image recording apparatus adopting the FAT scheme like this, a buffer memory is provided in order to temporarily hold the to-be-recorded image signals. Also, recording is in the order of from the vacant area greater in capacity to increase the effective record rate of image signals. That is, the higher the frequency in moving the movable recording member the lower the effective recording rate. Accordingly, in the prior art, recording has been made in the order of from the area maximum in vacancy.

However, when recording signals less in signal amount than a capacity of the buffer memory as with still image signals, the signals can be properly recorded without increase of the effective record rate. On the contrary, where recording signals greater in signal amount than a capacity of the buffer memory as with motion image signals, partial missing possibly occurs in the to-be-recorded signals unless the effective record rate is increased to a high speed.

SUMMARY OF THE INVENTION

Therefore, it is a primary object of the present invention to provide an image recording apparatus capable of properly recording both still and motion image signals.

According to the present invention, an image recording apparatus for recording a motion image signal and a still image signal by a niovable recording member onto a recording medium sporadically distributed with a plurality of vacant areas, comprising: a selector for selecting any one of a motion image record mode and a still image record mode; a first detector for detecting a vacant area satisfying a first condition concerning at least one of a position and a size when the motion image record mode is selected; a first recorder for recording the motion image signal to a vacant area detected by the first detector; a second detector for detecting a vacant area satisfying a second condition concerning at least one of the position and the size but different from the first condition when the still image record mode is selected; and a second recorder for recording the still image signal to a vacant area detected by the second detector.

When the motion image mode is selected, an area satisfying a first condition concerning at least one of a position and a size is detected by the first detector. The first recorder records, by the movable recording member, a motion image signal to a vacant area detected by the first detector. On the other hand, when the still image record mode is selected, a vacant area satisfying a second condition concerning at least one of the position and the size but different from the first condition is detected by the second detector. The second recorder records, by the movable recording member, a still image signal to an area detected by the second detector.

In this manner, because the condition for determining a vacant area is different in between the motion image record mode and the still image record mode, it is possible to properly record any of the still and motion image signals.

In one embodiment of the invention, the first condition is a condition that the size is maximum.

In another embodiment of the invention, the recording medium is sporadically distributed with vacant areas in the number of M, and the second condition being Nth (1<N<M) greater in size.

In still another embodiment of the invention, the recording medium is a disk-formed recording medium, and the first condition being a condition of being positioned innermost of the disk-formed recording medium. In this case, the second condition is a condition that the size is maximum.

In a yet another embodiment of the invention, the recording medium is a disk-formed recording medium, and the first condition being a condition of being positioned outermost of the disk-formed recording medium. In this case, the second condition is a condition that the size is maximum.

In another embodiment of the invention, the first condition is a condition that the size is maximum and a first predetermined value is exceeded.

In this case, the second condition is a condition that the size is maximum of vacant areas not exceeding the first predetermined value. Also, the second condition further includes condition that the number of vacant areas not exceeding the first predetermined value is equal to or greater than a predetermined number. In this case, the second condition is a condition that the size is maximum if the number of vacant areas not exceeding the first predetermined value is less than the predetermined number.

Also, the recording medium is sporadically distributed with vacant areas in the number of M, and the second condition being a condition of Nth (1<N<M) greater in size.

In another embodiment of the invention, the second condition is a condition that the size is maximum of a plurality of vacant areas integrated in size in the smaller order up to having a total size exceeding the second predetermined value.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
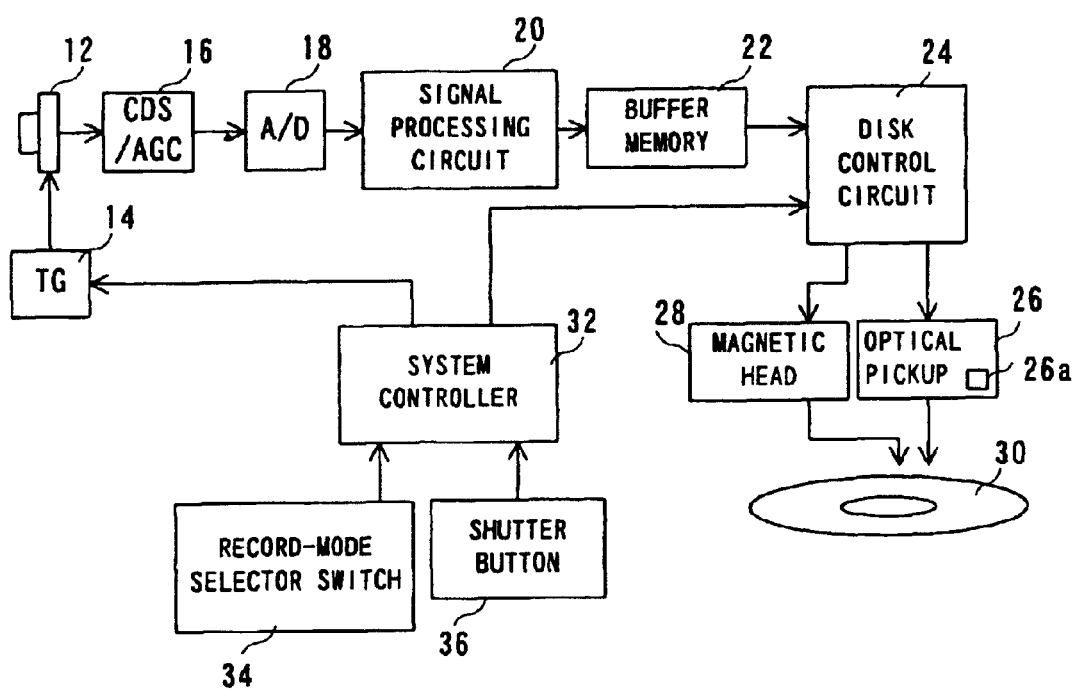
FIG. 1 is a block diagram showing one embodiment of the present invention.

Referring to FIG. 1, a digital camera 10 of this embodiment includes an image sensor 12 to take pictures of a subject. The image sensor 12 performs photoelectric conversion on the optical image of the subject illuminated to a light-receiving surface and produces electric charges (camera signals) corresponding to the subject image.

When a shutter button 36 is pressed in a state that a still-image record mode is established by a record-mode selector switch 34, a system controller 32 instructs a TG14 to read out all the pixels of camera signals of one screen. The TG14 drives the image sensor 12 by an all-pixel-reading scheme only during a period corresponding to one screen. Due to this, a high-resolution camera signal caused on the light-receiving surface is outputted from the image sensor 12.

On the other hand, when a motion-image record mode is established by the record-mode selector switch 34 and the shutter button 36 is pressed, the system controller 32 instructs the TG14 to read camera signals through thinning-out. The TG14 drives the image sensor 12 by the thinning-out scheme. As a result, a low-resolution camera signal is outputted from the image sensor 12. Incidentally, reading by thinning-out is suspended at a time that the shutter button 36 is again pressed.

The camera signal outputted from the image sensor 12 is subjected to well-known noise removal and level adjustment. The camera signal thus processed is converted into a digital signal by an A/D converter 18. The A/D-converted camera signal is transformed into a YUV signal by a signal processing circuit 20, and the YUV signal is further subjected to JPEG compression. In the still-image record mode, the YUV signal only in one screen is obtainable so that a compressed YUV signal of one screen is produced based on the one screen of the YUV signal. On the contrary, in the motion-image record mode, YUV signals of a plurality of screens are obtained. In such a case, JPEG compression is made on a screen-by-screen basis thereby producing compressed YUV signals of a plurality of screens. The compressed YUV signal thus produced is written to a buffer memory 22 by the same signal processing circuit 20.

Incidentally, the buffer memory 22 has a capacity for storing at least one-screen of high-resolution compressed YUV signals. The one-screen of compressed YUV signals produced in the still-image mode is all stored onto the buffer memory 22.

The compressed YUV signals stored in the buffer memory 22 is read out by a disk control circuit 24 and recorded to an magneto-optical disk 30 according to an MS-DOS format by an optical pickup 26 and magnetic head 28. Specifically, the disk control circuit 24 first detects a vacant area out of the magneto-optical disk 28 and then moves the optical pickup 26 and magnetic head 28 toward the detected vacant area.

Subsequently, the compressed YUV signal is read out of the buffer memory 22, and a semiconductor laser 26a provided on the optical pickup 26 is caused to output laser light. A record current corresponding to the read-out compressed YUV signal is flowed to the magnetic head 28. Due to this, compressed YUV signals are recorded to the vacant areas. Where there are remaining compressed YUV signals in the buffer memory even after the vacant areas become full, the disk control circuit 24 again detects a vacant area and moves the optical pickup 26 and magnetic head 28 to the detected vacant area. Then, the remaining compressed YUV signals are read out of the buffer memory 22 and the compressed YUV signals are recorded to the vacant area by the semiconductor laser 26 and magnetic head 28.

As a result, even where vacant areas are sporadically distributed, compressed YUV signals are properly recorded to each vacant area.

Here, the manner of detecting vacant areas is different in between the still-image record mode and the motion-image record mode. The one-screen compressed YUV signals produced in the still-image record mode are all stored to the buffer memory 22 as stated above. Consequently, in the still-image record mode, even if the effective record rate is somewhat reduced due to jump of the optical pickup 26 and magnetic head 28, the compressed YUV signals will be recorded without missing.

In the motion-image record mode, however, there is no guarantee that the compressed YUV signals of a plurality of screens are all stored to the buffer memory 22 without missing. Due to this, if the effective record rate decreases in the motion-image record mode, missing occurs in the to-be-recorded compressed YUV signals. That is, reading out is frequently interrupted due to jump of the optical pickup 26 and magnetic head 28. When the buffer memory 22 becomes full, the succeeding compressed YUV signals cannot be written in. As a result, missing possibly occurs in the compressed YUV signals to be recorded to the magneto-optical disk 30.

In order to solve such a problem, in the present embodiment, the manner of detecting vacant areas is switched in between the still-image record mode and the motion-image record mode. That is, in the still-image record mode, compressed YUV signals are recorded in the order of from a minimum vacant area whereas, in the motion-image record mode, compressed YUV signals are recorded in the order of from a maximum vacant area. Because the greater the vacant area the frequency decreases to jump the optical pickup 26 and magnetic head 28, the effective record rate can be increased in the motion-image record mode. As a result, it is possible to prevent the to-be-recorded compressed YUV signals (motion image signals) from being missed.

Figures 2, 3:
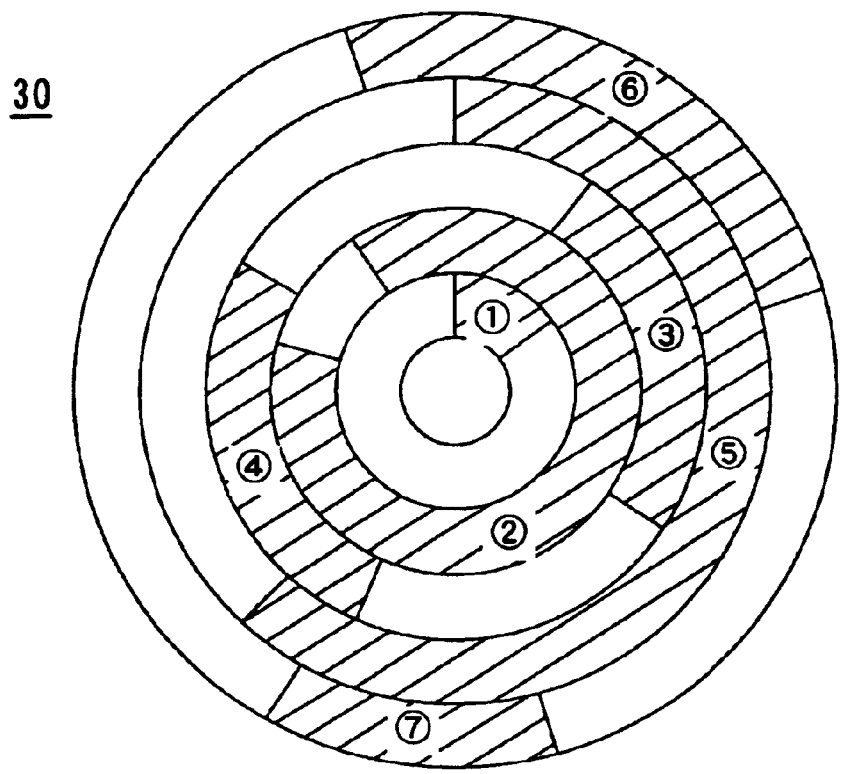
FIG. 2 is an illustrative view showing one example of vacant areas formed on an optical disk.
FIG. 3 is an illustrative view showing one example of a list of vacant areas.
Figure 4:
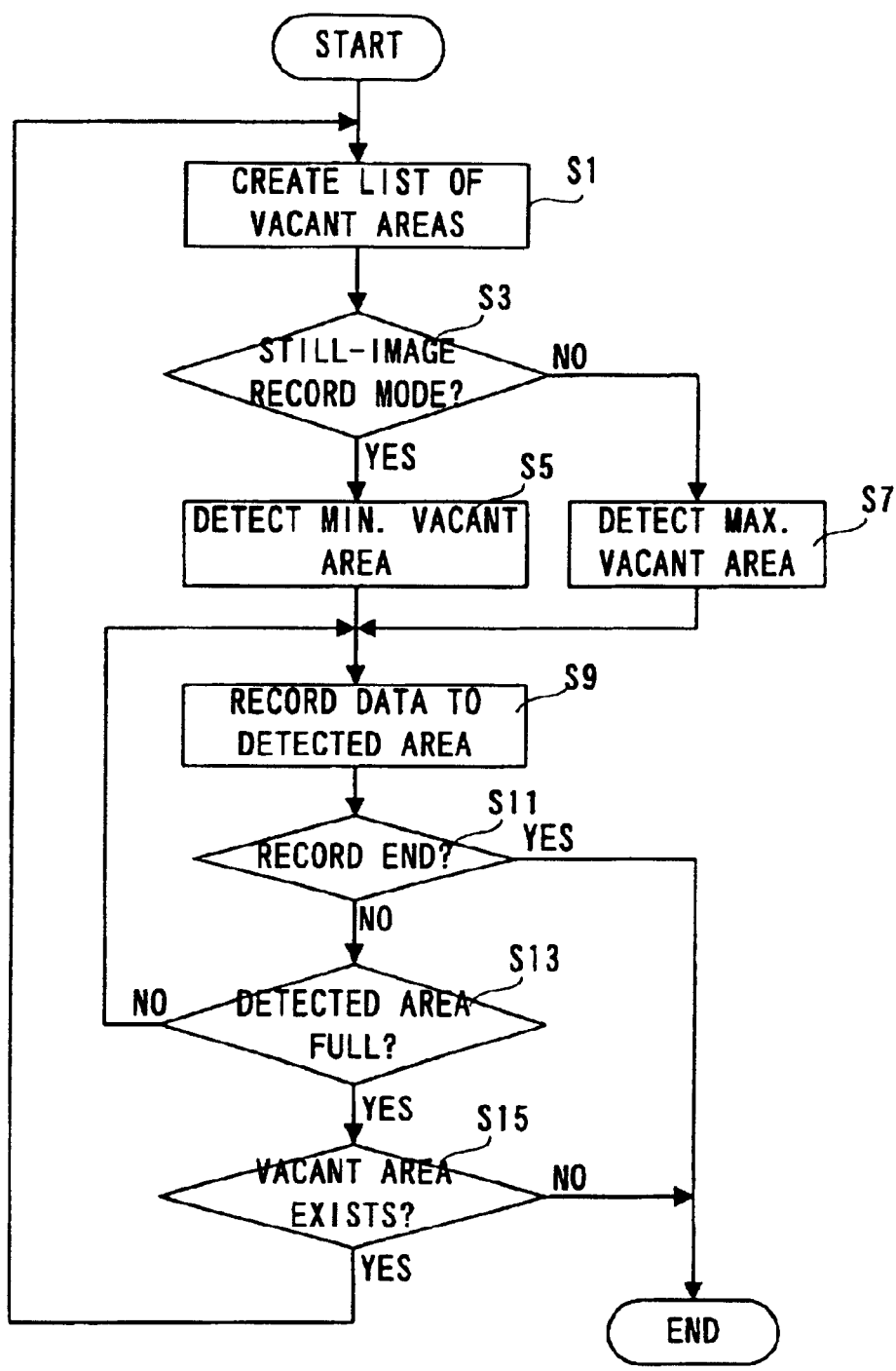
FIG. 4 is a flowchart showing operation of the FIG. 1 embodiment.

The disk control circuit 24 concretely processes a flowchart shown in FIG. 4. At first, in step S1, file management data is read out of the FAT region of the magnet optical disk 30, and a list of vacant areas is created on the basis of the read-out file management data. In the case that vacant areas ①–⑦ are formed in the hatched regions in FIG. 2, a list of vacant areas is created as shown in FIG. 3. According to FIG. 3, a vacant area ① with a size of 320K bytes is formed in an address of "3" and the following, and a vacant area ② with a size of 5030K bytes is formed in an address of "48" and the following. Also, a vacant area ③ with a size of 2450K bytes is formed in an address of "71" and the following, and a vacant area ④ with a size of 2680K bytes is formed in an address of "96" and the following.

Furthermore, a vacant area ⑤ with a size of 7020K bytes is formed in an address of "132" and the following, and a vacant area ⑥ with a size of 3410K bytes is formed in an address of "155" and the following, and a vacant area ⑦ with a size of 1200K bytes is formed in an address of "174" and the following.

After preparing the vacant-area list, the disk control circuit 24 in step S3 determines a current record mode. Where the selected record mode is a still-image record mode, the disk control circuit 24 in step S3 determines "YES" and in step S5 detects a minimum-sized vacant area in the vacant-area list. On the other hand, where a motion-image record mode is selected, the disk control circuit 24 proceeds from step S3 to step S7 to detect a maximum-sized vacant area in the vacant-area list.

In the following step S9, a record process is made for the vacant area detected in the step S5 or step S7. At first, the optical pickup 26 and magnetic head 28 is moved toward the detected vacant area. Next, a predetermined quantity of compressed YUV signal is read out of the buffer memory 22. Thereafter, the semiconductor laser 26a and magnetic head 28 is driven to record the read-out compressed YUV signal to the vacant area. In step S11, it is determined whether all the compressed YUV signals have been recorded or not, i.e. whether the buffer memory 22 becomes empty or not. If "YES", the process is ended. On the contrary, if the compressed YUV signals to be recorded are left in the buffer memory 22, the process proceeds from the step S11 to step S13 to determine whether the vacant area for recording is full or not. If not full, the process returns to the step S9 whereas, if full, the process advances to step S15 to further determine in the vacant-area list whether there exists a vacant area or not. If there is still a vacant area, the process returns to the step S1. However, when no vacant area is available, the process is ended.

In this manner, where there exists compressed YUV signals to be recorded, recording to the same vacant area is continued until a full is reached. When the vacant area is full and another vacant area exists, a vacant-area list is again created to thereby detect again a vacant area satisfying a predetermined condition. The remaining compressed YUV signals are recorded by a predetermined quantity at one time to the detected vacant area.

Consequently, where vacant areas are distributed as shown in FIG. 2, if still-image recording only is made, the compressed YUV signals forming a still image will be stored to the vacant areas in the order as ①→⑦→③→④→⑥→②→⑤. On the other hand, in the state of a vacant-area distribution state as shown in FIG. 2, if motion-image recording only is made, the compressed YUV signals forming a motion image will be stored to the vacant areas in the order as ⑤→②→⑥→③→③→⑦→①.

Figure 5:
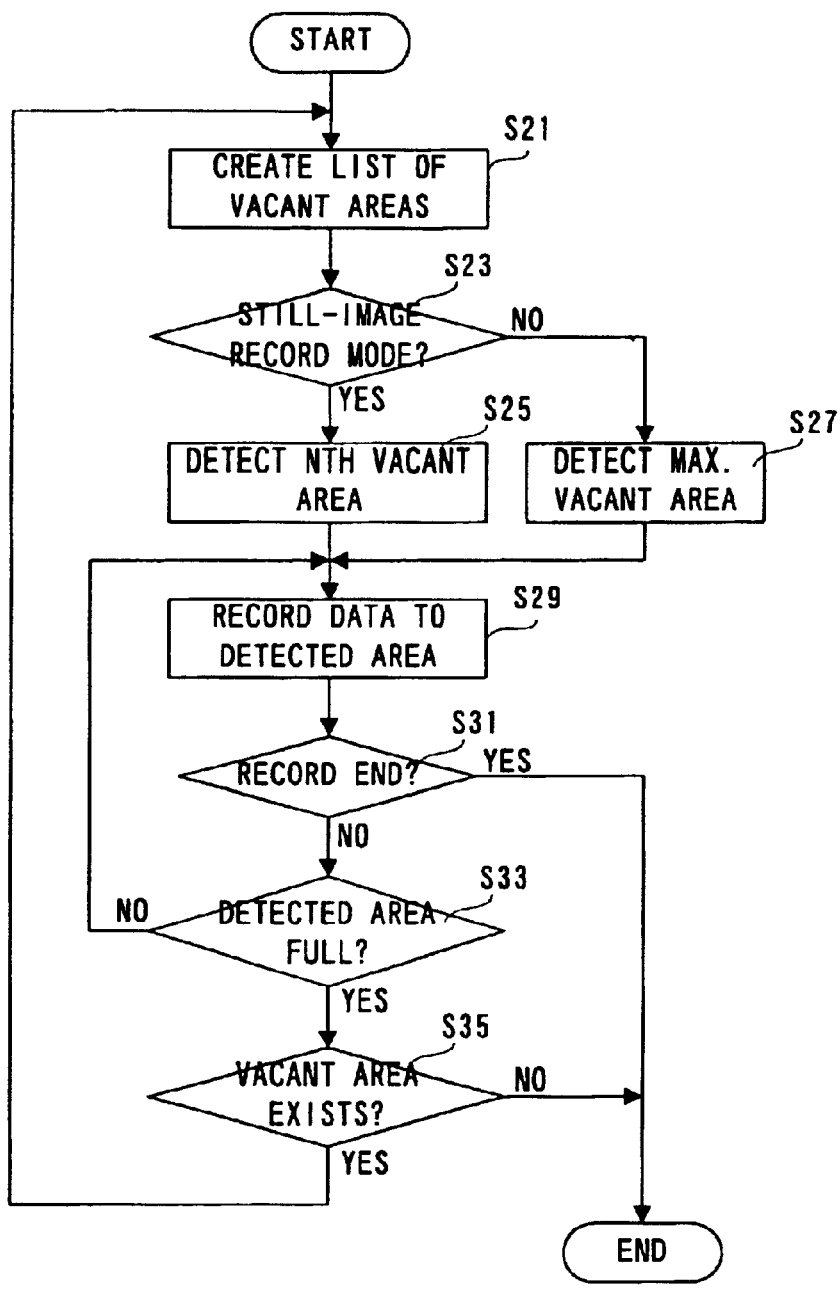
FIG. 5 is a flowchart showing operation of another embodiment of the invention.

In a digital camera 10 of another embodiment, the disk control circuit 24 processes a flowchart shown in FIG. 5. It should be noted that this flowchart is similar to the flowchart of FIG. 4 except for step S25. That is, steps S21 and S23 are same as the steps S1 and S3, while steps S27 to S35 are same as the steps S1 to S15. Hence, duplicated explanations will be omitted as much as possible.

In the case that vacant areas in the number of M are formed on the magneto-optical disk 30, in step S25 is detected a vacant area that is Nth (1<N<M) greater in size. That is, in the still-image record mode, an Nth greater vacant area is detected so that the compressed YUV signals are recorded to this vacant area. If N=4 for example, a vacant area ④ is detected in step S25. Such a process makes possible to increase the effective record rate even in the stiu-image record mode, as compared to the embodiment of FIG. 4.

Figure 6:
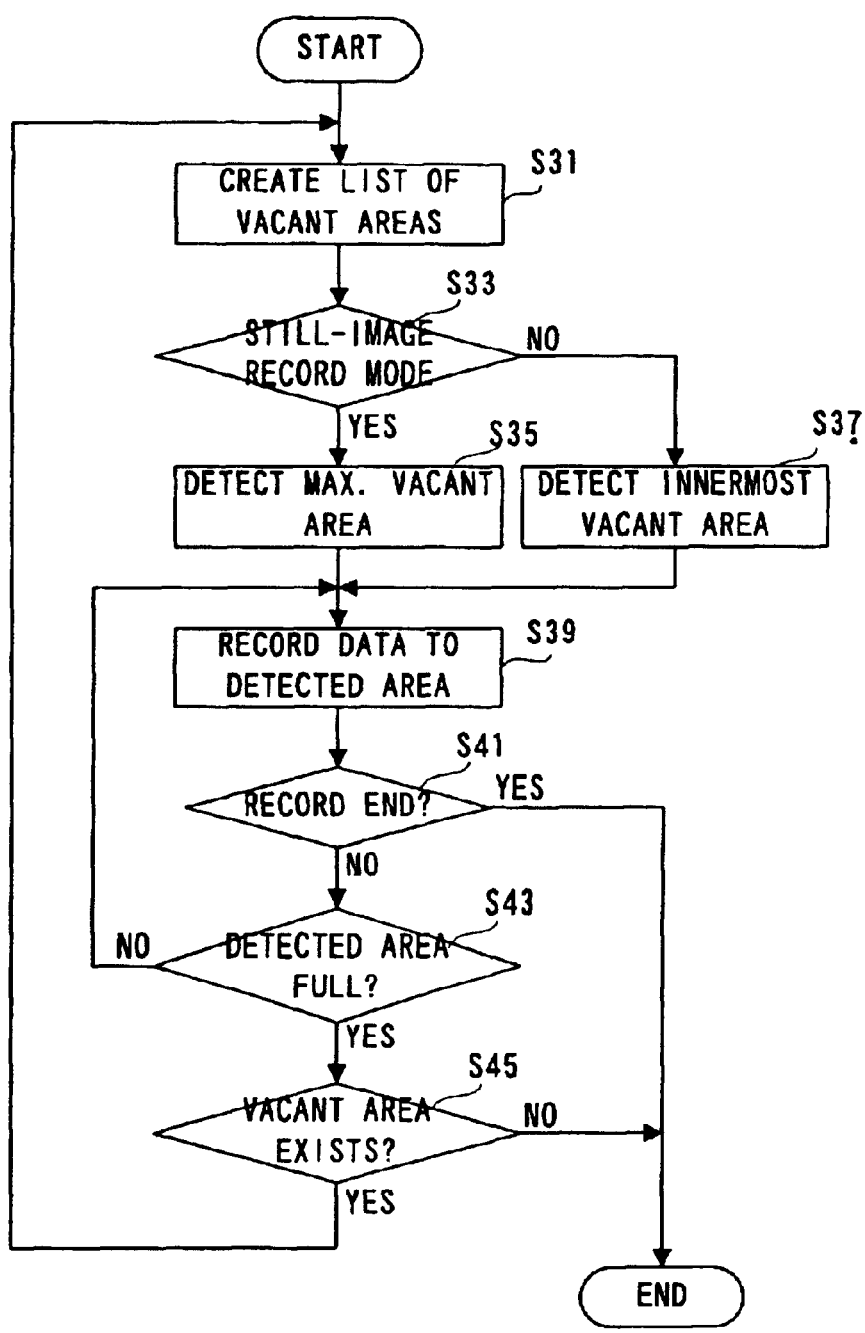
FIG. 6 is a flowchart showing operation of still another embodiment of the invention.

In a digital camera 10 of still another embodiment, the disk control circuit 24 processes a flowchart shown in FIG. 6. This flowchart is also similar to the flowchart of FIG. 6 except for steps S35 and S37. That is, steps S31 and S33 are same as the steps S1 and S3, and steps S39 to S45 are same as the steps S9 to S15. Hence, duplicated explanations will be omitted as much as possible.

In step S35 is detected a maximum-sized vacant area, and in step S37 is detected a vacant area positioned in the innermost periphery. That is, in the still-image record mode, compressed YUV signals are recorded to the vacant areas in the order of greater in size. In the motion-image record mode, compressed YUV signals are recorded in the order of from a vacant area in the innermost periphery. When recording of motion images is started in a state of vacant-area distribution as shown in FIG. 2, compressed YUV signals will be recorded to the vacant areas in the order as ①→②→③→⑤→⑥→⑦. Where recording is made in the order of from the innermost periphery in the motion-image record mode, the direction of jump is always in one direction of from the inward to outward although there is no decrease in the frequency of jump. Due to this, the effective record rate is faster than that of the conventional art. Also, in the still-image record mode, the detection of maximum vacant area increases the effective record rate in this mode.

Figure 7:
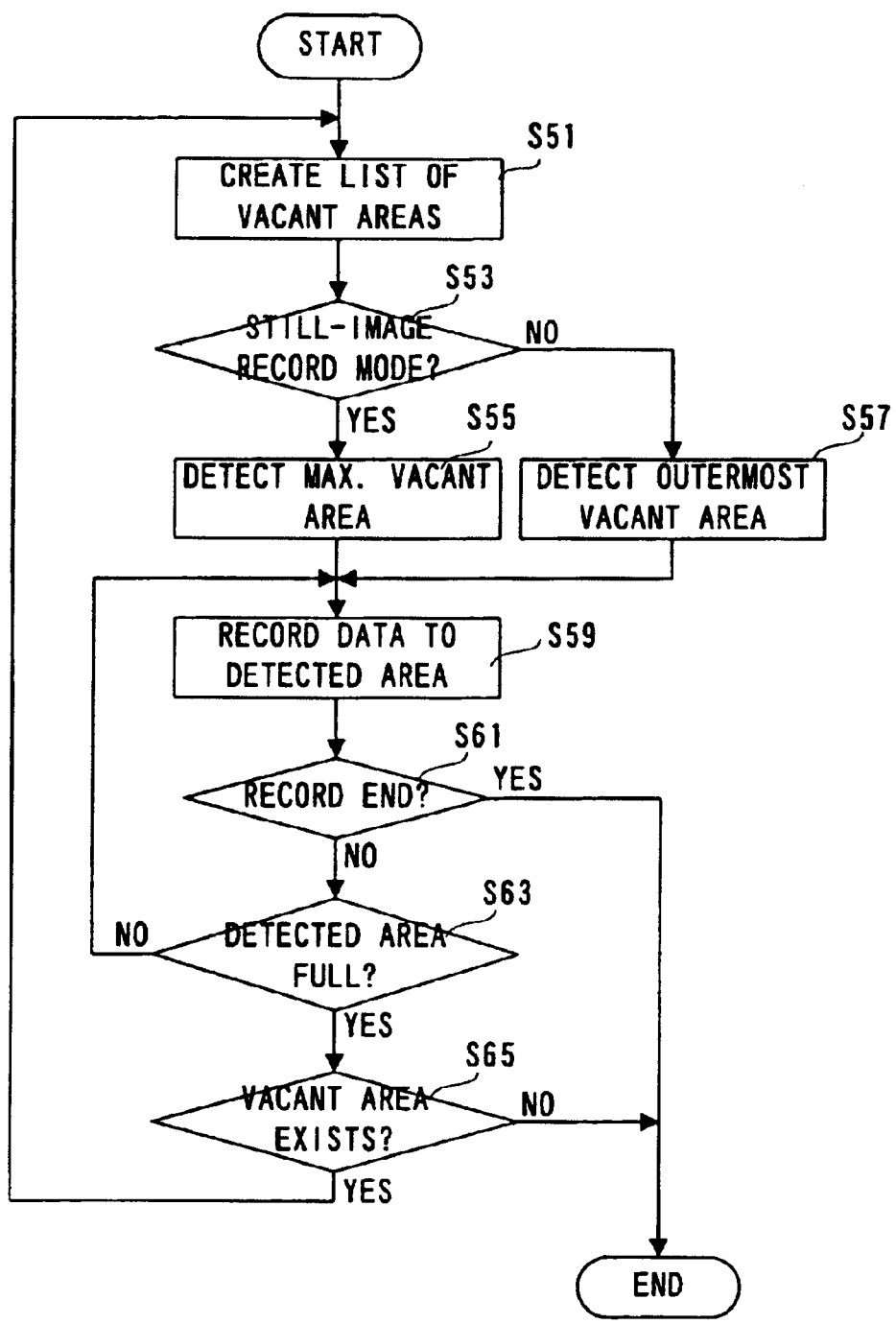
FIG. 7 is a flowchart showing operation of yet another embodiment of the invention.

Furthermore, in a digital camera 10 of yet another embodiment, the disk control circuit 24 processes a flow-chart shown in FIG. 7. This flowchart is the same as the flowchart of FIG. 6 except that a vacant area in the outermost periphery is detected in step S57. That is, steps S51 to S55 are same as the steps S31 to S35, while steps S59 to S65 are same as the steps S39 to S45. Hence, duplicated explanations will be omitted. In also this embodiment, where a motion-image record mode is selected, jump is always in one direction of from an outer periphery toward an inner periphery although the frequency of jump is not lessened. That is, compressed YUV signals are recorded to the vacant areas in the order as ⑦→⑥→④③→②→①. Accordingly, the effective record rate is faster than that of the conventional art.

Figure 8:
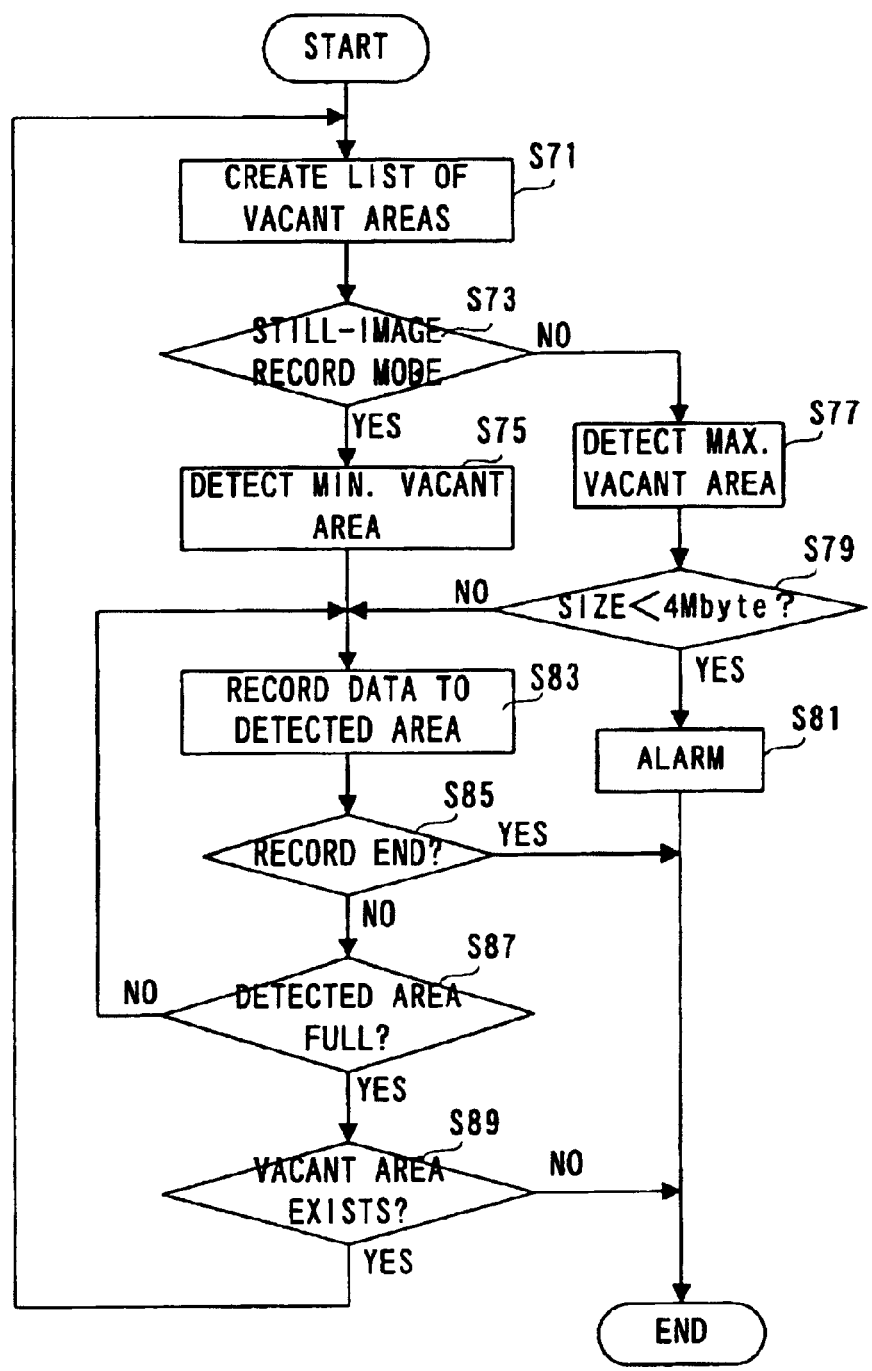
FIG. 8 is a flowchart showing operation of another embodiment of the invention.

In a digital camera 10 of another embodiment, the disk control circuit 24 processes a flowchart shown in FIG. 8. It should be noted that steps S71 to S77 are same as the steps S1 to S7 of FIG. 4 and the steps S83 to S89 are same as the steps S9 to S15 of the same FIG. 4. Hence, duplicated explanations will be omitted.

In step S79, it is determined whether the size of a vacant area detected in step S77 is below 4M bytes or not If the size≧4M bytes, the process advances to step S83. If the size<4M bytes, an alarm is issued indicating capacity shortage in step S81 and then the process is ended. Accordingly, if both the vacant areas are less than 4M bytes, recording of motion images is impossible to perform. In other words, the vacant areas of less than 4M bytes are secured for recording still images. The compressed YUV signals produced in the still image mode are stored to the vacant areas of less than 4M bytes in the order of smaller in vacant area.

If recording of motion images is started in the state of vacant-area distribution state shown in FIG. 2, compressed YUV signals are recorded to the vacant areas ⑤ and ② in this order. When the vacant area ② becomes full, recording is impossible to perform. After the vacant areas ⑤ and ② become full, the vacant areas ①, ③, ④, ⑥ and ⑦ of less than 4M bytes are left and accordingly still images are recorded to these vacant areas.

Figure 9:
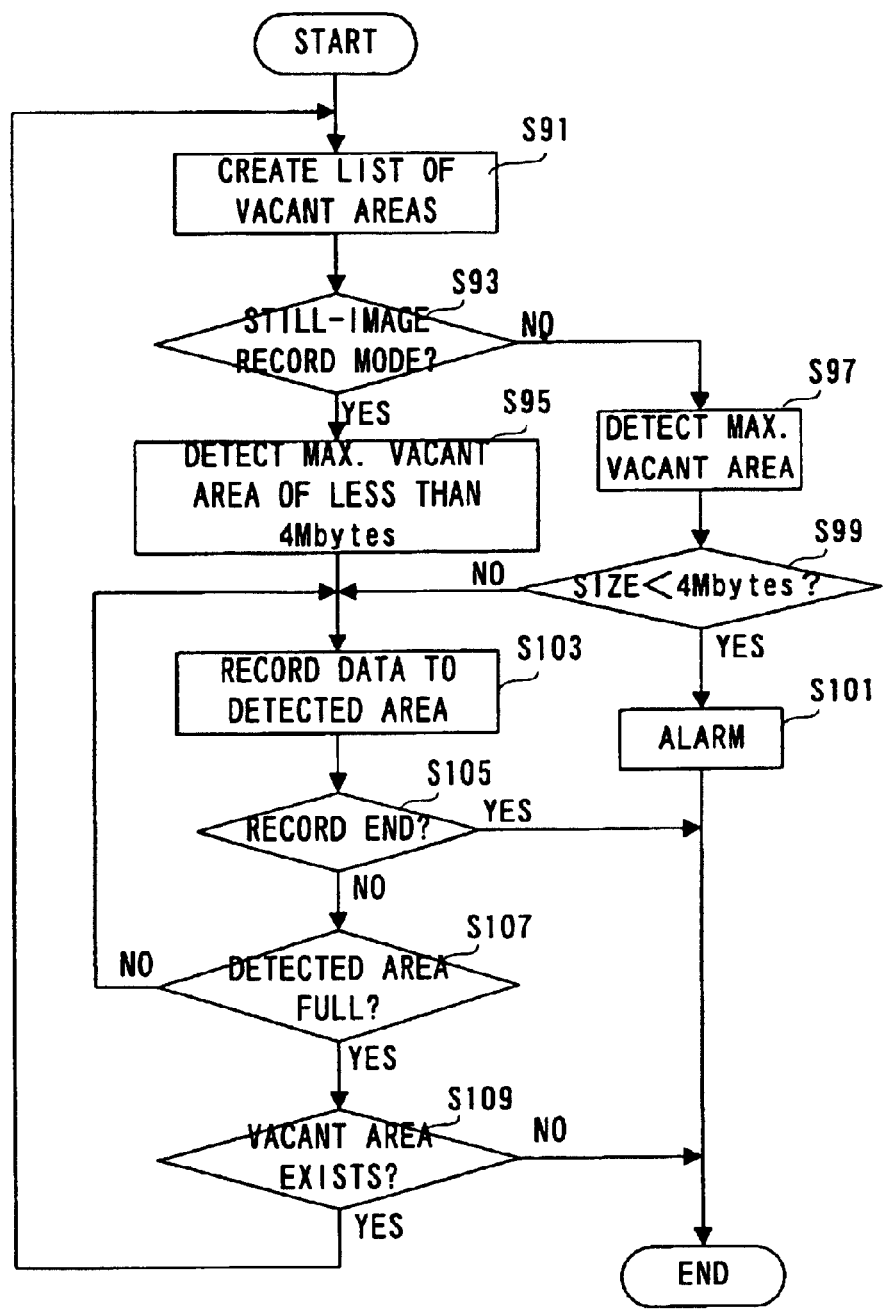
FIG. 9 is a flowchart showing operation of still another embodiment of the invention.

In a digital camera 10 of still another embodiment, the disk control circuit 24 processes a flowchart shown in FIG. 9. It should be noted that this flowchart is the same as the flowchart of FIG. 8 except for step S95. That is, steps S91 and S93 are same as the steps S71 and S73, and steps S97 to S109 are same as the steps S77 to S89.

In step S95, a maximum vacant area is detected from among the vacant areas of less than 4M bytes. As described above, the vacant areas of less than 4M bytes are secured for recording still images, to which areas no motion images will be recorded. If still images are recorded to these vacant areas exclusive for recording still images in the order of greater in size, the effect record rate is increased even in the still-image record mode. Also, because the vacant areas of greater than 4M bytes are secured for recording motion images, motion images can be recorded to the vacant areas ② and ⑤ even after the vacant areas ①, ③, ④, ⑥ and ⑦ become full of still images.

Figure 10:
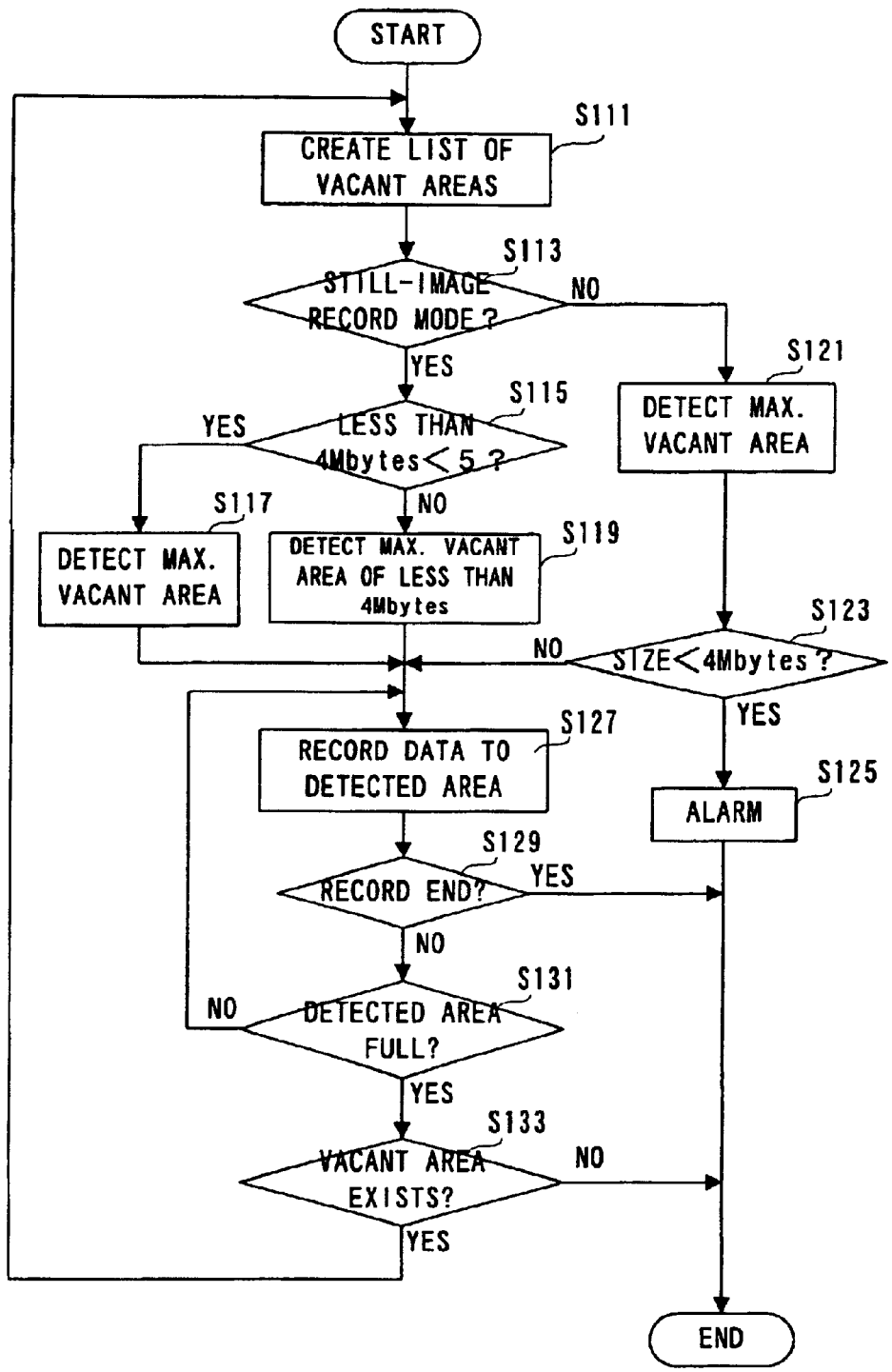
FIG. 10 is a flowchart showing operation of yet another embodiment of the invention.

In a digital camera 10 of yet another embodiment, the disk control apparatus 24 processes a flowchart shown in FIG. 10. It should be noted that steps Sill and S113 are same as the steps S91 and S93 of FIG. 9, steps S121 to S125 are same as the steps S97 to S101 of FIG. 9, and steps S127 to S133 are same as the steps S103 to S109 of FIG. 8. Hence, duplicated explanations will be omitted.

In step S115, reference is made to a vacant-area list to determine the number of vacant areas of less than 4M bytes. If the number of vacant areas of less than 4M bytes is smaller than "5", in step S117 a maximum vacant area is detected from among all the vacant areas. On the contrary, if the number of vacant areas of less than 4M bytes is "5" or greater, then in step S119 a maximum vacant area is detected from among the vacant areas of less than 4M bytes.

If only the vacant areas of less than 4M bytes are allocated for recording still images as in the FIG. 9 embodiment, there arises a problem that still images cannot be recorded in a state that there are many vacant areas of equal to or greater than 4M bytes, i.e. in a state that there is a sufficient vacant capacity on the magneto-optical disk 30. In order to solve such a problem, in this embodiment, where the number of the vacant areas of less than 4M bytes is smaller than a predetermined number, a maximum vacant area is detected from among all the vacant areas so that the still image is recorded to the detected vacant area. Accordingly, still images are recorded to the vacant areas to be allocated for recording motion images as the size of a vacant area may be.

Figure 11:
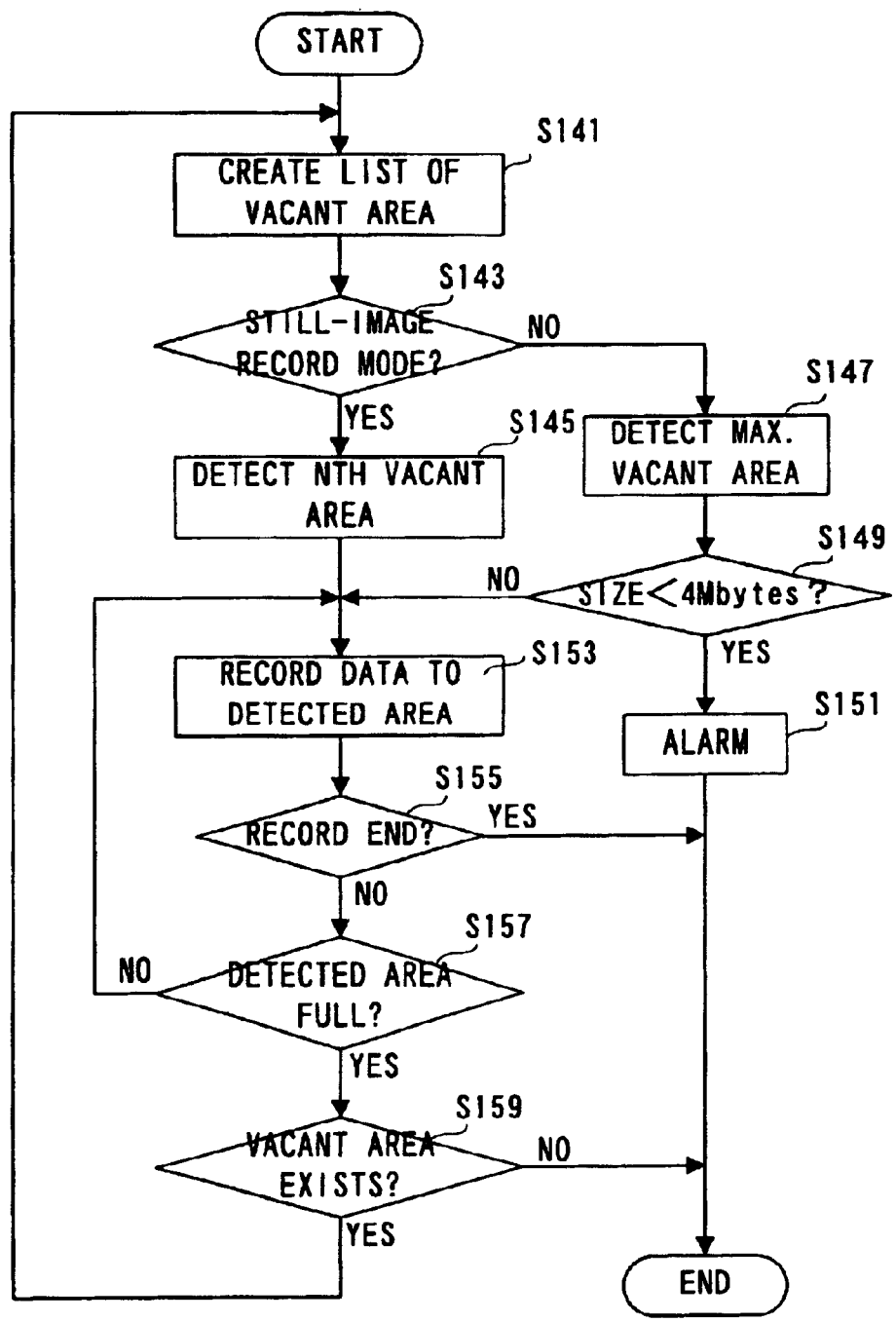
FIG. 11 is a flowchart showing operation of another embodiment of the invention.

In a digital camera 10 of another embodiment, the disk control circuit 24 processes a flowchart shown in FIG. 11. It should be noted that steps S141 and S143 are same as the steps S71 and S73 of FIG. 8 and steps S147 to S159 are same as the steps S77 to S89 of FIG. 8. Hence, duplicated explanations will be omitted.

Where vacant areas in the number of M are formed, in step S145 a vacant area that is Nth (1<N<M) greater in size is detected. This process is similar to the step S25 of FIG. 5. Accordingly, if N=5 for example, a vacant area ③ is detected. This increases the effective record rate in the still-image record mode.

Figure 12:
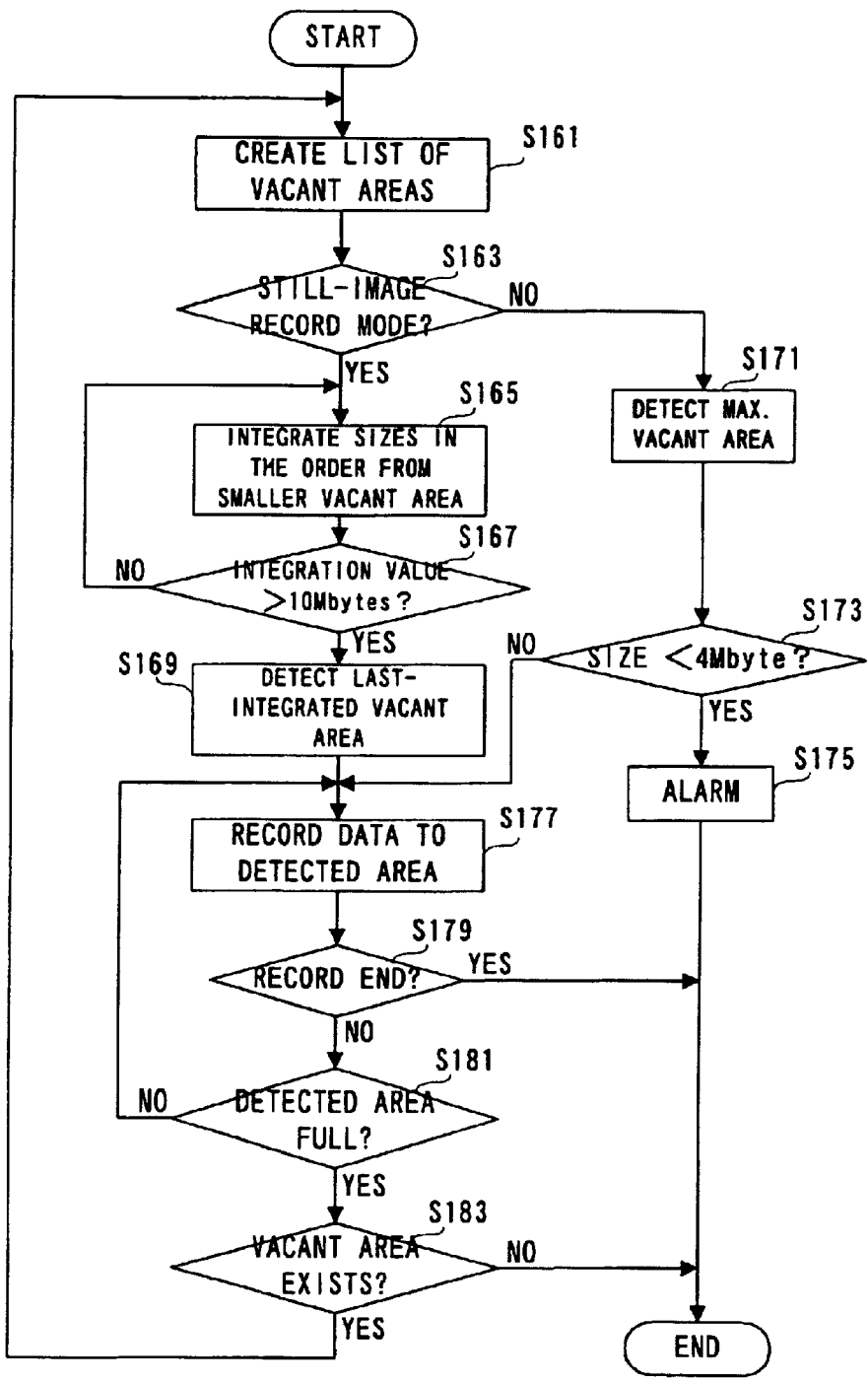
FIG. 12 is a flowchart showing operation of still another embodiment of the invention.

In a digital camera 10 of still another embodiment, the disk control apparatus 24 processes a flowchart of FIG. 12. It should be noted that steps S161 and S163 are same as the steps S71 and S73 of FIG. 8, steps S171 to S175 are same as the steps S77 to S81 of FIG. 8, and steps S177 to S183 are same as the steps S83 to S89 of FIG. 8. Hence, duplicated explanations will be omitted.

In step S165, the vacant area sizes are integrated one by one in the order of a smaller-sized vacant area. If one round of integration completes, it is determined in step S167 whether an integration value exceeds 10M bytes or not. If the integration value≦10M bytes, the process returns to the step S165 whereas, if the integration value>10M bytes, the process advances to step S169. In the step S169, the last-integrated vacant area is detected. When the vacant areas are distributed as shown in FIG. 2, if a still-image record mode is selected, the vacant area sizes are integrated in the order of ①→⑦→③→④→⑥. At the time that the size of a vacant area ⑥ (3410K bytes) is integrated, the integration value becomes 10060K bytes thus exceeding 10M bytes. In step S169, a vacant area ⑥ is detected.

By such a process, the vacant area for recording still images is always secured with a size of 10M bytes, and still images are recorded to a maximum-sized vacant area of the vacant areas forming 10M bytes. Accordingly, the effective record rate for still images can be increased.

Incidentally, the magneto-optical disks to be used in this embodiment include AS-MOS (Advanced Storage Magneto Optical Disks), DVDs (Digital Versatile Disks) and MDs (Mini Disks). Also, this invention is applicable to any image recording apparatus for recording image signals to a recording medium sporadically distributed with vacant areas. Also, although this embodiment adopted the MS-DOS FAT scheme as a management scheme for recording-medium image signals, the management scheme may adopt the UDF (Universal Disk Format) scheme.

Furthermore, although the embodiments of FIG. 8 to FIG. 12 provided as a condition for recording motion images are condition that the maximum vacant area in size exceeds 4M bytes (steps S79, S99, S123, S149, S173), it is needless to say that this value is not limited to 4M bytes. It is however noted that there is a need of agreement between this value and the value used in the step S95 of the FIG. 9 embodiment and steps S115 and S119 of the FIG. 10 embodiment.

Also, although the FIG. 10 embodiment made processing differently depending upon whether or not there exist five or more vacant areas, it is natural that the number used in determining a branching of a process is not limited to "5". Furthermore, although in the FIG. 12 embodiment the last-integrated vacant area is detected when the integration value in vacant area size exceeds 10M bytes, it is needless to say that this value is also not limited to 10M bytes.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image recording apparatus for recording a motion image signal and a still image signal by a movable recording member onto a recording medium sporadically distributed with a plurality of vacant areas, comprising:
 a selector for selecting any one of a motion image record mode and a still image record mode;
 a first detector for detecting a vacant area satisfying a first condition concerning at least one of a position and a size when the motion image record mode is selected;
 a first recorder for recording the motion image signal to a vacant area detected by said first detector;
 a second detector for detecting a vacant area satisfying a second condition concerning at least one of the position and the size but different from the first condition when the still image record mode is selected; and a second recorder for recording the still image signal to a vacant area detected by said second detector.

2. An image recording apparatus according to claim 1, wherein the first condition is a condition that the size is maximum.

3. An image recording apparatus according to claim 2, wherein the first condition is a condition that the size is maximum and a first predetermined value is exceeded.

4. An image recording apparatus according to claim 3, wherein said recording medium is sporadically distributed with vacant areas in the number of M, and the second condition being a condition of Nth (1<N<M) greater in size.

5. An image recording apparatus according to claim 3, wherein the second condition is a condition that the size is maximum of vacant areas not exceeding the first predetermined value.

6. An image recording apparatus according to claim 5, wherein the second condition further includes condition that the number of vacant areas not exceeding the first predetermined value is equal to or greater than a predetermined number.

7. An image recording apparatus according to claim 6, wherein the second condition is a condition that the size is maximum if the number of vacant areas not exceeding the first predetermined value is less than the predetermined number.

8. An image recording apparatus according to claim 1, wherein said recording medium is sporadically distributed with vacant areas in the number of M, and the second condition being Nth (1<N<M) greater in size.

9. An image recording apparatus according to claim 1, wherein said recording medium is a disk-formed recording medium, and the first condition being a condition of being positioned innermost of said disk-formed recording medium.

10. An image recording apparatus according to claim 9, wherein the second condition is a condition that the size is maximum.

11. An recording apparatus according to claim 1, wherein said recording medium is a disk-formed recording medium, and the first condition being a condition of being positioned outermost of said disk-formed recording medium.

12. An image recording apparatus according to claim 11, wherein the second condition is a condition that the size is maximum.

13. An image recording apparatus according to claim 1, wherein the second condition is a condition that the size is maximum of a plurality of vacant areas integrated in size in the smaller order up to having a total size exceeding the second predetermined value.

* * * * *